US012685971B2

(12) United States Patent (10) Patent No.: US 12,685,971 B2

Hayashi et al. (45) Date of Patent: Jul. 21, 2026

(54) AERATION MODULE

(71) Applicant: SUMITOMO ELECTRIC FINE POLYMER, INC., Osaka (JP)

(72) Inventors: Fumihiro Hayashi, Osaka (JP); Takamasa Hashimoto, Osaka (JP); Yoshimasa Suzuki, Osaka (JP)

(73) Assignee: SUMITOMO ELECTRIC FINE POLYMER, INC., Osaka (JP)

( * ) Notice: Subject to any disclaimer, the term of this patent is extended or adjusted under 35 U.S.C. 154(b) by 326 days.

(21) Appl. No.: 18/289,561

(22) PCT Filed: Feb. 7, 2022

(86) PCT No.: PCT/JP2022/004757

§ 371 (c)(1),
(2) Date: Nov. 4, 2023

(87) PCT Pub. No.: WO2022/239333

PCT Pub. Date: Nov. 17, 2022

(65) Prior Publication Data

US 2024/0246038 A1     Jul. 25, 2024

(30) Foreign Application Priority Data

May 11, 2021     (JP) ................................. 2021-080631

(51) Int. Cl.

| | |
|---|---|
| *B01D 69/08* | (2006.01) |
| *B01D 69/02* | (2006.01) |
| *B01D 71/36* | (2006.01) |
| *B01F 23/23* | (2022.01) |
| *B01F 23/237* | (2022.01) |
| *B01F 101/00* | (2022.01) |

(52) U.S. Cl.
CPC ............. *B01D 69/08* (2013.01); *B01D 69/02* (2013.01); *B01D 71/36* (2013.01); *B01F 23/237611* (2022.01); *B01D 2325/02* (2013.01); *B01D 2325/04* (2013.01); *B01F 2101/305* (2022.01)

(58) Field of Classification Search
CPC .. B01D 69/08; B01D 69/02; B01F 23/237611
See application file for complete search history.

(56) References Cited

U.S. PATENT DOCUMENTS

| | | | |
|---|---|---|---|
| 2001/0042716 A1 | 11/2001 | Iversen et al. | |
| 2021/0379537 A1 | 12/2021 | Hayashi et al. | |

FOREIGN PATENT DOCUMENTS

| | | | |
|---|---|---|---|
| JP | H04-236961 A | | 8/1992 |
| JP | H06296836 A | * | 10/1994 |

(Continued)

*Primary Examiner* — Robert A Hopkins
(74) *Attorney, Agent, or Firm* — Renner, Otto, Boisselle & Sklar, LLP

(57) ABSTRACT

An aeration module capable of aerating a liquid supplied to inner portions of hollow-fiber membranes includes a housing containing a fluororesin as a main component, and a plurality of the hollow-fiber membranes containing polytetrafluoroethylene or a modified polytetrafluoroethylene as a main component. A porosity K [%], an average thickness T1 [mm], and an average outer diameter D2 [mm] of the hollow-fiber membranes satisfy a relation of a formula of $K/(T1 \times D2 \times 100) \geq 2.0$.

9 Claims, 2 Drawing Sheets

(56)          References Cited

FOREIGN PATENT DOCUMENTS

| JP | H10501733 | A | 2/1998 |
| JP | 3048652 | B2 * | 6/2000 |
| JP | 2000246064 | A | 9/2000 |
| JP | 2003311140 | A | 11/2003 |
| JP | 2016217649 | A | 12/2016 |
| JP | 2019166474 | A | 10/2019 |
| WO | 2020084930 | A1 | 4/2020 |

* cited by examiner

AERATION MODULE

TECHNICAL FIELD

The present disclosure relates to an aeration module. This application claims priority based on Japanese Patent Application No. 2021-80631 filed on May 11, 2021, and the entire contents of the Japanese patent application are incorporated herein by reference.

BACKGROUND ART

Aeration modules are used not only for filtration of a solid-liquid separator but also for an aeration module for removing a gas such as oxygen dissolved in a liquid and an aeration device for supplying a gas to a liquid. For example, there is known an aeration device that produces gas-dissolved water in which gas is dissolved in pure water for cleaning applications in the field of electronic device manufacturing and home electric appliances, hydrogen water in which hydrogen gas is dissolved in pure water for beverage applications, or carbonated water in which carbon dioxide gas is dissolved in pure water for beverage applications, or the like.

As the aeration module for aeration or gas removal, or the aeration module including such aeration modules, for example, there has been proposed an aeration module for aeration and gas removal which is provided with a suction device for sucking gas from the aeration module and an aeration device for supplying gas to the aeration module (see PTL 1).

PRIOR ART DOCUMENT

Patent Literature

PTL 1: Japanese Unexamined Patent Application Publication No. 2016-217649

SUMMARY OF INVENTION

According to an aspect of the present disclosure, an aeration module capable of aerating a liquid supplied to inner portions of hollow-fiber membranes includes a housing containing a fluororesin as a main component, and a plurality of the hollow-fiber membranes containing polytetrafluoroethylene or a modified polytetrafluoroethylene as a main component. A porosity K [%], an average thickness T1 [mm], and an average outer diameter D2 [mm] of the hollow-fiber membranes satisfy a relation of a formula (1) below.

$$K/(T1 \times D2 \times 100) \geq 2.0 \tag{1}$$

DETAILED DESCRIPTION

Figure 1:
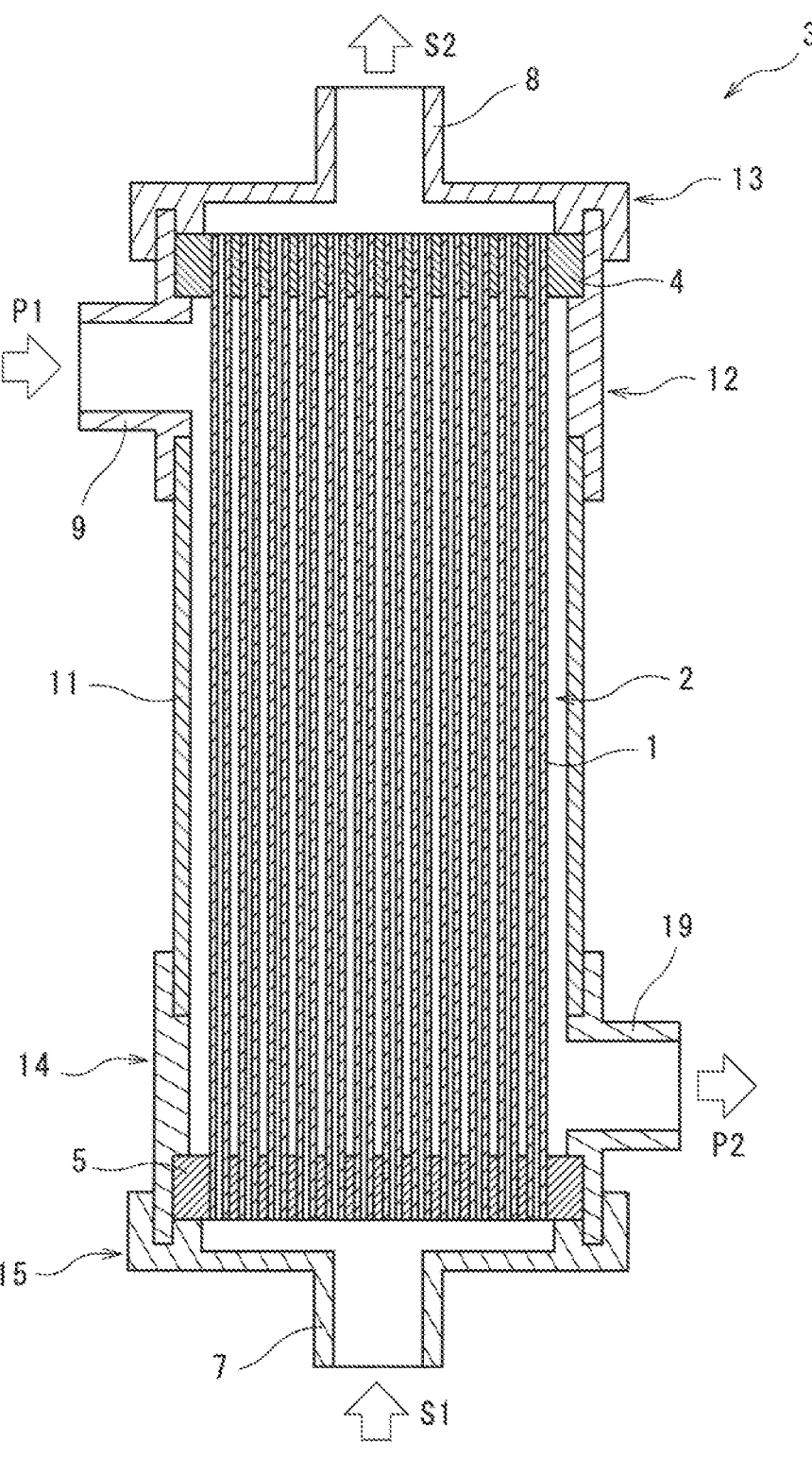
FIG. 1 is a schematic cross-sectional view of an aeration module of one embodiment of the present disclosure.

Problems to be Solved by Present Disclosure

In recent years, aeration modules have been employed in various applications such as semiconductors, foods, medicines, and wastewater treatment, and are required to be compact and to have improved aeration performance and chemical resistance.

The present disclosure has been made in view of such circumstances, and an object thereof is to provide an aeration module which can be made compact and is excellent in aeration performance and chemical resistance.

Advantageous Effects of Present Disclosure

The aeration module according to one aspect of the present disclosure can be made compact and is excellent in aeration performance and chemical resistance.

Description of Embodiments of Present Disclosure

First, embodiments of the present disclosure will be listed and explained.

According to an aspect of the present disclosure, an aeration module capable of aerating a liquid supplied to inner portions of hollow-fiber membranes includes a housing containing a fluororesin as a main component, and a plurality of the hollow-fiber membranes containing polytetrafluoroethylene or a modified polytetrafluoroethylene as a main component. A porosity K [%], an average thickness T1 [mm], and an average outer diameter D2 [mm] of the hollow-fiber membranes satisfy a relation of a formula (1) below.

$$K/(T1 \times D2 \times 100) \geq 2.0 \tag{1}$$

The aeration module includes a plurality of hollow-fiber membranes each having the porosity K [%], the average thickness T1 [mm], and the average outer diameter D2 [mm] that satisfy the relationship of the formula (1). Thus, the aeration module can achieve high aeration performance and water pressure resistance, and can be made compact. In addition, the hollow fiber membrane containing polytetrafluoroethylene or the modified polytetrafluoroethylene as the main component and the housing containing fluororesin as the main component are provided, thereby having excellent chemical resistance. Here, the "main component" refers to a component having the largest content ratio in terms of mass, for example, a component having a content ratio of 50% by mass or more, preferably 70% by mass or more, and more preferably 95% by mass or more.

The term "porosity" refers to a ratio of the total volume of pores to the total volume of the hollow-fiber membrane, and can be determined by measuring the density in accordance with ASTM-D-792. A dry weight and a weight in water of the sample are measured in the unit of 0.0001 g and the difference between them gives the sample volume. A true specific gravity of polytetrafluoroethylene (PTFE) was taken as 2.17 g/cm³, and the volume of the resin constituting the sample was calculated from the dry weight. The ratio of the void volume, which is obtained by subtracting the volume of the resin from the volume of the sample, to the volume of the sample is expressed in %, and is defined as the porosity. As another method, specifically, the porosity can be measured by the following procedure. First, the length (L) of the hollow-fiber membrane whose porosity is to be measured is measured in 1 mm unit. Next, the weight (W) of the hollow-fiber membrane is measured in the unit of 0.0001 g using an electronic balance. Then, based on the measured values, porosity [%] is calculated by the following formula.

$$\text{Porosity } [\%] = \left\{ 1 - \frac{\text{volume of resin only } [\text{cm}^3] \div}{\text{total volume of hollow-fiber membrane } [\text{cm}^3]} \right\} \times 100 =$$

$$\{1 - (W \text{ [g]} \div \rho \text{ [g/cm}^3\text{])}\} \div$$

$$(\pi(D2^2 \text{ [mm}^2\text{]} - D1^2 \text{ [mm}^2\text{]}) \times L \text{ [mm]} \div 1000)\} \times 100$$

Here, "$\rho$" represents the true specific gravity of polytetrafluoroethylene and is 2.17 [g/cm$^3$].

The "average thickness" of the hollow-fiber membrane can be obtained by dividing (average outer diameter—average inner diameter) by 2. The "average outer diameter" refers to an average value of outer diameters at any two points when the cross section of the hollow-fiber membrane is circular. When the hollow-fiber membrane has an elliptical cross section, the diameters of the minor axis and the major axis are measured at two points, and the average value is taken as the average outer diameter. When the cross section of the hollow-fiber membrane is a modified cross section other than the general circle or ellipse, edge information of an outer shape of the cross section is extracted and approximated to a circle, and a value obtained by dividing the obtained inner circumferential length by pi is used as the average outer diameter. The term "average inner diameter" refers to an average value of inner diameters at any two points. Specifically, the average outer diameter can be measured by the following procedure. First, the hollow-fiber membrane is sliced along a plane perpendicular to the longitudinal direction and observed with an electron microscope so that the entire cross-section is within the field of view. The outer diameters are measured at two substantially diagonal positions (positions where the phase is shifted by about 90 degrees) of the cross section, and the average value is defined as the average outer diameter (D2).

Preferably, the hollow-fiber membranes have a heat of fusion of 30 J/g to 45 J/g. When the hollow-fiber membrane has the heat of fusion of within the above range, it is possible to obtain the hollow-fiber membrane having a high degree of crystallinity and a pore size and a porosity in a better range.

The heat of fusion of the hollow-fiber membrane is measured using a differential scanning calorimeter, and is an endothermic amount between 296° C. and 343° C. in a third step of measurement by the differential scanning calorimeter. Specifically, the heat of fusion of the hollow fiber membrane is a heat of fusion from 296° C. to 343° C. in the third step when the hollow fiber membrane undergoes the first to third step. The first step includes heating from room temperature to 245° C. at a rate of 50° C./min followed by heating from 245° C. to 365° C. at a rate of 10° C./min. The second step includes cooling from 365° C. to 350° C. at a rate of −10° C./min, keeping the temperature, cooling from 350° C. to 330° C. at a rate of −10° C./min, and further cooling from 330° C. to 305° C. at a rate of −1° C./min. The third step includes cooling from 305° C. to 245° C. at a rate of −50° C./min followed by the heating from 245° C. to 365° C. at a rate of 10° C./min. The sample amount in the above measurement is from 10 mg to 20 mg, and the sampling time is 0.5 seconds/time.

Preferably, the hollow-fiber membranes have the average outer diameter D2 of 0.70 mm or less, an average inner diameter D1 of 0.32 mm or less, a water pressure resistance of 0.3 MPa or more, and the porosity K of 30% or more. When the average outer diameter, the average inner diameter, the water pressure resistance, and the porosity K of the hollow-fiber membrane are within the above ranges, a bundle of hollow-fiber membranes having a high water pressure resistance and a high porosity while having a small thickness and a small diameter can be formed. Thus, the aeration module can be made compact and improved in aeration performance.

The term "average inner diameter" refers to an average value of inner diameters at any two points. The average inner diameter can be measured by the following procedure. First, the hollow-fiber membrane is sliced along a plane perpendicular to the longitudinal direction and observed with an electron microscope so that the entire cross-section is within the field of view. The inner diameters are measured at two substantially diagonal positions (positions where the phase is shifted by about 90 degrees) of the cross section, and the average value is defined as the average inner diameter (D1). The term "water pressure resistance" refers to a pressure at which water starts to leak from one side of the membrane when water pressure is applied to the other side of the membrane, and is also referred to as a water leakage pressure. In general, when the pore size of the through-hole is large, water easily leaks and the water pressure resistance is low, whereas when the pore size is small, the water pressure resistance is high. In particular, the water pressure resistance is measured in accordance with JIS-L1092 (2009). To be more specific, the lumen of the hollow-fiber membrane is filled with water, and the water pressure into the lumen is continuously increased at a rate of 100 kPa/min, and the water pressure resistance is defined as the pressure at which water leaks out as drops from the outer surface of the hollow-fiber membrane.

When pure water with a dissolved oxygen concentration of 0.6 ppm or less is supplied to the inner portions of the hollow-fiber membranes and air is caused to permeate at a pressure of 10 kPa, a maximum flow rate per minute at which the pure water after aeration treatment is capable of maintaining a dissolved oxygen concentration of 8 ppm or more may be 0.035 mL/(cm$^2$·min) or more relative to a unit inner surface area of the hollow-fiber membranes. In the aeration module, since the maximum flow rate per minute at which the pure water after the aeration treatment can maintain the dissolved oxygen concentration of 8 ppm or more is within the above range, the flow rate can be increased while the gas can be supplied to the liquid at high concentration with a smaller membrane area, and the aeration effect is more excellent. As used herein, the term "inner surface area" refers to a surface area of the inner surface of the hollow-fiber membrane.

Preferably, the main component of the housing is a tetrafluoroethylene/perfluoroalkyl vinyl ether copolymer, polytetrafluoroethylene, a tetrafluoroethylene/hexafluoropropylene copolymer, or a combination thereof. When the housing contains the fluororesin as the main component, chemical resistance and mechanical strength can be improved.

Details of Embodiments of Present Disclosure

Hereinafter, an aeration module according to each embodiment of the present disclosure will be described in detail with reference to the drawings.

<Aeration Module>

An aeration module according to another aspect of the present disclosure is an aeration module capable of aerating a liquid supplied into the hollow-fiber membranes. The aeration module includes a housing and a plurality of the hollow-fiber membranes. The hollow-fiber membrane walls allow gas to pass through while preventing liquid leakage. The aeration module can be applied to any field of application. For example, the aeration module can be applied to cleaning waters for semiconductors, electronic devices, medical use, production of foods and beverages, purification and neutralization of industrial waste waters, river waters, lake waters, pool waters, public bathhouse waters, and the like, water treatment of drinking water, industrial waters, and the like, and enrichment of liquid with specific gases by permeation of gases such as oxygen, ozone, carbon-dioxide, nitrogen, hydrogen, and the like.

The aeration module can be used in both of an integrated type in which the aeration module is fixed in various devices and the like, and a replaceable cartridge type in which a housing and a membrane member having a plurality of hollow-fiber membranes are independent from each other and the membrane member is inserted into the housing for use.

FIG. 1 shows an aeration module 3 for aeration as an example of an aeration module according to an embodiment of the present disclosure. Aeration module 3 includes a membrane member 2 having a plurality of hollow-fiber membranes 1 arranged in one direction, and a cylindrical housing 11 for housing membrane member 2. Aeration module 3 is of a type that allows gas to pass through hollow-fiber membranes 1 and aerate the liquid supplied into hollow-fiber membranes 1.

Membrane member 2 has a first sealing portion 4 for holding one ends of the plurality of hollow-fiber membranes 1 and a second sealing portion 5 for holding the other ends of the plurality of hollow-fiber membranes 1. In each of first sealing portion 4 and second sealing portion 5, a potting agent is filled between hollow-fiber membranes 1 and between the bundle of hollow-fiber membranes and the inner surface of the housing.

The potting agent contains resin, rubber or elastomer as a main component. The potting agent is not particularly limited, and examples thereof include an epoxy resin, a urethane resin, an ultraviolet curable resin, a fluororesin, a silicone resin, a polyamide resin, and a polyolefin resin such as polyethylene or polypropylene. Among them, fluororesin and silicone resin are preferable from the viewpoint of having good performance as an adhesive with the hollow-fiber membrane containing polytetrafluoroethylene or the modified polytetrafluoroethylene (modified PTFE) as a main component and the housing containing fluororesin as a main component.

Aeration module 3 may have a configuration that includes cylindrical housing 11, a first sleeve 12 mounted on one end of housing 11 and having an engaging structure for engaging a gas supply port 9 and first sealing portion 4, a first cap 13 for sealing the one end of housing 11 on first sleeve 12 and having a liquid discharge port 8, a second sleeve 14 mounted on the other end of housing 11 and having an engaging structure for engaging a gas discharge port 19 and second sealing portion 5, and a second cap 15 for sealing the other end of housing 11 on second sleeve 14 and having a liquid supply port 7.

Aeration module 3 has liquid supply port 7 for supplying raw water in an S1 direction on an end face of one end, and has liquid discharge port 8 for discharging the liquid permeated through the plurality of hollow-fiber membranes 1 in an S2 direction on an end face of the other end. Gas supply port 9 through which gas is supplied in a P1 direction and gas discharge port 19 through which gas is discharged in a P2 direction are provided on a side surface of housing 11. The arrangement positions and directions of gas supply port 9 and gas discharge port 19 are not particularly limited, and may be configured according to the installed state of aeration module 3.

The raw water supplied from liquid supply port 7 into hollow-fiber membranes 1 is supplied into housing 11. Then, the liquid after the aeration treatment is discharged from liquid discharge port 8 provided on the side surface near the other end of housing 11.

Aeration module 3 has excellent chemical resistance by including the housing containing the fluororesin as the main component and the plurality of hollow-fiber membranes containing polytetrafluoroethylene or the modified polytetrafluoroethylene as the main component. Thus, the type of raw water is not particularly limited, and various liquids such as pure water, drinking water, chemical liquid, and waste water can be used depending on the purpose.

The gas supplied from gas supply port 9 is sucked from the wall surfaces of hollow-fiber membranes 1 toward gas discharge port 19, and is discharged from the tip of gas discharge port 19 while aerating the liquid supplied into hollow-fiber membranes 1.

Examples of the gas to be supplied include air, oxygen, carbon dioxide, hydrogen, ozone, nitrogen, hydrogen sulfide and ammonia.

Housing 11 contains the fluororesin as the main component. Since housing 11 contains the fluororesin as the main component, it has excellent chemical resistance. The fluororesin is preferably a tetrafluoroethylene/perfluoroalkyl vinyl ether copolymer, a polytetrafluoroethylene, a tetrafluoroethylene/hexafluoropropylene copolymer, or a combination thereof. Chemical resistance and mechanical strength can be improved by using such fluororesin as the main component of housing 11.

In aeration module 3, when pure water with a dissolved oxygen concentration of 0.6 ppm or less is supplied to the inner portions of the hollow-fiber membranes and air is caused to permeate at a pressure of 10 kPa, a maximum flow rate per minute at which the pure water after aeration treatment is capable of maintaining the dissolved oxygen concentration of 8 ppm or more is preferably $0.035 \text{ mL}/(\text{cm}^2 \text{ min})$ or more relative to a unit inner surface area of the hollow-fiber membranes 1. In aeration module 3, when the maximum flow rate per minute at which the pure water after the aeration treatment can maintain the dissolved oxygen concentration of 8 ppm or more is in the range described above, the liquid can be efficiently aerated with a high concentration of gas, and the aeration effect is more excellent.

[Hollow-Fiber Membrane]

Figure 2:
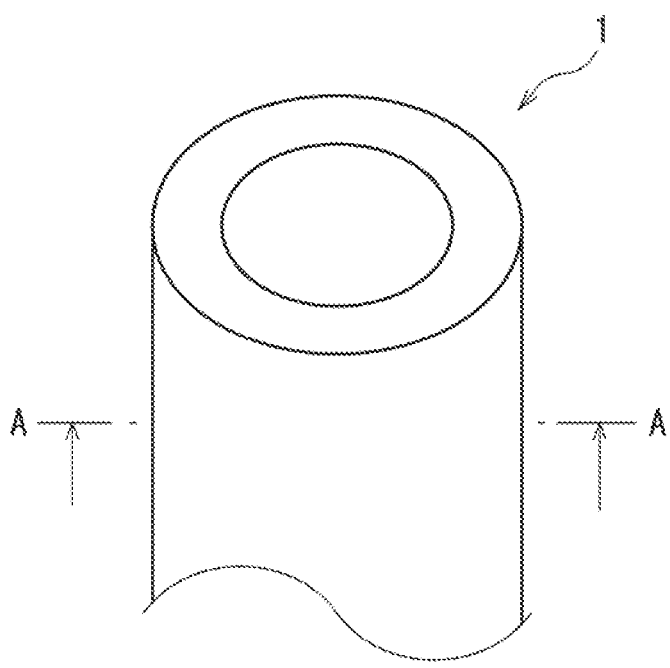
FIG. 2 is a schematic perspective view of a hollow-fiber membrane according to one embodiment of the present disclosure.
Figure 3:
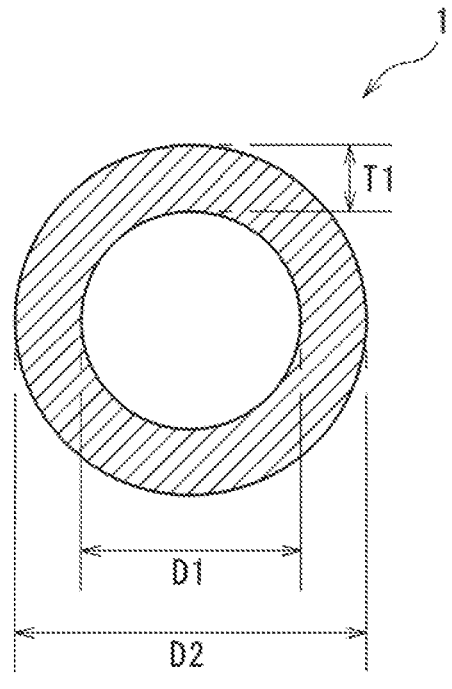
FIG. 3 is a cross-sectional view of the hollow-fiber membrane of FIG. 2 taken along line A-A.

Hollow-fiber membrane 1 shown in FIGS. 2 and 3 contains polytetrafluoroethylene or the modified polytetrafluoroethylene as the main component. Since polytetrafluoroethylene and the modified polytetrafluoroethylene are fluororesins having excellent chemical resistance and solvent resistance, selectivity of the types of liquid and gas supplied to aeration module 3 is improved. In addition, since polytetrafluoroethylene and the modified polytetrafluoroethylene are highly hydrophobic fluororesins, liquid leakage from hollow-fiber membranes 1 is suppressed, and gas permeability can be improved.

The modified polytetrafluoroethylene means a polytetrafluoroethylene in which hexafluoropropylene (HFP), alkyl vinyl ether (AVE), chlorotrifluoroethylene (CTFE) or the like is copolymerized in a small amount, preferably 1/50 (molar ratio) or less with respect to tetrafluoroethylene.

The lower limit of an average outer diameter D2 of hollow-fiber membrane 1 is not particularly limited, but is preferably 0.1 mm, and more preferably 0.2 mm. On the other hand, the upper limit of average outer diameter D2 of hollow-fiber membrane 1 is preferably 0.70 mm, and more preferably 0.4 mm. When average outer diameter D2 is less than the lower limit, the pressure loss may increase. On the other hand, when average outer diameter D2 exceeds the upper limit, the area of the membranes contained in housing 11 may be reduced, or the pressure resistance strength may be lowered to cause rupture due to the internal pressure or buckling due to the external pressure.

The lower limit of an average inner diameter D1 of hollow-fiber membrane 1 is not particularly limited, but is preferably 0.05 mm, and more preferably 0.1 mm. On the other hand, the upper limit of average inner diameter D1 of the hollow-fiber membrane is preferably 0.32 mm, and more preferably 0.2 mm. When average inner diameter D1 is less than the lower limit, the pressure loss may increase. On the other hand, when average inner diameter D1 exceeds the upper limit, the pressure-resistant strength is low, and there is a concern that rupture due to internal pressure or buckling due to external pressure may occur.

The lower limit of an average thickness T1 of hollow-fiber membrane 1 is preferably 0.01 mm and more preferably 0.02 mm. On the other hand, the upper limit of average thickness T1 of hollow-fiber membrane 1 is preferably 0.20 mm and more preferably 0.10 mm. When average thickness T1 is less than the lower limit, the pressure-resistant strength is low, and rupture due to internal pressure or buckling due to external pressure may occur. On the other hand, when average thickness T1 exceeds the upper limit, the gas permeability may decrease.

The lower limit of a porosity K of hollow-fiber membrane 1 is preferably 30%, more preferably 40%. On the other hand, the upper limit of porosity K of hollow-fiber membrane 1 is not particularly limited, but is preferably 80%, and more preferably 70% When porosity K of hollow-fiber membrane 1 is less than the lower limit, the gas permeability may decrease, and the aeration performance of hollow-fiber membrane 1 may decrease. When porosity K of hollow-fiber membrane 1 exceeds the upper limit, the mechanical strength of hollow-fiber membrane 1 decreases, and there is a concern that a decrease in durability or breakage such as rupture due to internal pressure may occur.

Porosity K [%], average thickness T1 [mm], and average outer diameter D2 [mm] of hollow-fiber membrane 1 satisfy a relationship of the formula (1) below $$K/(T1 \times D2 \times 100) \geq 2.0 \qquad (1)$$

When porosity K [%], average thickness T1 [mm], and average outer diameter D2 [mm] of hollow-fiber membrane 1 satisfy the relationship of the formula (1), the aeration module can achieve high aeration performance and water pressure resistance and can be made compact. When K/(T1× D2×100) is less than 2.0, there is a possibility that the aeration module is deteriorated in aeration performance or water pressure resistance, or it is difficult to be made compact.

The lower limit of an average pore size of hollow-fiber membrane 1 is preferably 3.0 nm, and more preferably 5.0 nm. On the other hand, the upper limit of the average pore size of hollow-fiber membrane 1 is preferably 50.0 nm, and more preferably 40.0 nm. When the average pore size is less than the lower limit, the aeration performance may be insufficient. On the other hand, when the average pore size exceeds the upper limit, water pressure resistance decreases, and a liquid such as water mixed with impurities such as a surfactant may leak out.

The average pore size is measured by a bubble point method (ASTM F316-86, JISK3832) using a fine pore size distribution analyzer or the like in the following procedure. First, the relationship between the differential pressure applied to the membrane and the air flow rate through the membrane is measured with the fine pore size distribution analyzer or the like when the membrane is dry and when the membrane is wet with liquid. Then, the obtained graphs are referred to as a dry curve and a wet curve, respectively, and when a differential pressure at an intersection point between the wet curve and a curve obtained by setting the flow rate of the dry curve to ½ is referred to as P (Pa), a value of d (nm) represented by an equation d=cγ/P is the average pore diameter. Note that c is a constant of 2860 and γ is a surface tension (dyn/cm=mN/m) of the liquid.

As another method, the pore size of the hollow-fiber membrane can also be measured by a bubble point method using a porometer which performs liquid-liquid phase substitution. In addition, since PTFE which is the main component of the hollow-fiber membrane is a hydrophobic resin, the pore size of the hollow-fiber membrane can also be measured using a pure water intrusion type porosimeter which is the same principle as that of the mercury intrusion type porosimeter by using the formula of Washburn.

In aeration module 3, the water pressure resistance of hollow-fiber membranes 1 is preferably 0.3 MPa or more, and more preferably 1.0 MPa or more. When the water pressure resistance of hollow-fiber membranes 1 is within the above range, a liquid can flow through aeration module 3 at a high pressure. Since the liquid can be made to flow through aeration module 3 at a high pressure, bubbling does not occur in the liquid even if the pressure of the aeration gas is increased, so that a gas dissolved liquid having a higher concentration can be produced.

The upper limit of a heat of fusion of hollow-fiber membrane 1 is preferably 45 J/g, more preferably 42 J/g. The lower limit of the heat of fusion of hollow-fiber membrane 1 is preferably 30 J/g, more preferably 33 J/g. When the heat of fusion of hollow-fiber membrane 1 exceeds the upper limit, the pore size may be increased. On the other hand, when the heat of fusion of hollow-fiber membrane 1 is less than the lower limit, the porosity may be reduced. When the heat of fusion of hollow-fiber membrane 1 is within the above range, it is possible to obtain hollow-fiber membrane 1 having a pore size and a porosity within better ranges with a high degree of crystallinity. As described above, the heat of fusion of hollow-fiber membrane 1 is the heat of fusion from 296° C. to 343° C. in the third step after going through the first step to the third step. When the hollow-fiber membrane is subjected from the first step to the third step, the heat of fusion from 296° C. to 343° C. in the third step is 30.0 J/g to 45.0 J/g, so that the hollow-fiber membrane can have characteristics suitable for stretching. Thus, the hollow-fiber membrane has high deformability and can be stretched beyond a general yield point appearing first on a load-elongation curve to a next inflection point appearing before breaking. As a result, porous hollow-fiber membranes having fine pore sizes can be obtained. Therefore, hollow-fiber membranes 1 are porous, and have the average outer diameters of 0.70 mm or less, the average inner diameters of 0.32 mm or less, high porosities K, and high water pressure resistances, which have not been achieved by conventional techniques.

In the conventional polytetrafluoroethylene generally used for molding, when the polytetrafluoroethylene is subjected from the first step to the third step, the heat of fusion in the third step is less than 30 J/g. Therefore, the heat of fusion is considered to be less than 30 J/g also for the hollow-fiber membrane of this polymer. It is considered that such a resin is used in consideration of moldability such as forming by mold and paste extrusion molding and strength of a molded article. For example, in paste extrusion, polytetrafluoroethylene having the above-mentioned heat of fusion of 20 J/g or less or about 25 J/g is used in accordance with the forming size and the like in order to make the qualities such as forming size and mechanical strength uniform. Hollow-fiber membrane 1 is different from the conventional hollow-fiber membrane in that the range of heat of fusion from 296° C. to 343° C. in the third step is 30.0 J/g to 45.0 J/g. Due to this difference, hollow-fiber membrane 1 has higher deformability than the conventional hollow-fiber membrane, and is significantly excellent in impact absorption and deformation adhesion. Furthermore, porous hollow-fiber membranes having fine pore sizes and high porosities can be obtained by stretching step.

The lower limit of an isopropanol bubble point of hollow-fiber membrane 1 is preferably 500 kPa, and more preferably 1000 kPa. The upper limit of the isopropanol bubble point of hollow-fiber membrane 1 is not particularly limited. When the isopropanol bubble point of hollow-fiber membrane 1 is less than the lower limit, the liquid-retaining force of hollow-fiber membrane 1 may be insufficient. The "isopropanol bubble point" is a value measured in accordance with ASTM-F316-86 using isopropanol, indicates a minimum pressure required to push out a liquid from pores, and is an indicator corresponding to the average of pore sizes.

The lower limit of a filling rate of hollow-fiber membranes 1 in aeration module 3 is preferably 30%, and more preferably 40%. On the other hand, the upper limit of the filling rate of hollow-fiber membranes 1 is preferably 70%, and more preferably 60%. When the filling rate of hollow-fiber membranes 1 is less than the lower limit, the aeration performance of aeration module 3 may be reduced. On the other hand, when the filling rate of hollow-fiber membranes 1 exceeds the upper limit, hollow-fiber membranes 1 may be crushed when hollow-fiber membranes 1 are filled in housing 11, or difficulty may occur when hollow-fiber membranes 1 are filled in the housing. Since the filling rate of hollow-fiber membranes 1 having high porosity and bubble point is 30% to 70%, aeration module 3 has excellent aeration performance. Here, the "filling rate of the hollow-fiber membranes" refers to a filling density of hollow-fiber membranes 1 filled in housing 11, and is a ratio (%) of the sum of the cross-sectional areas occupied by hollow-fiber membranes 1 obtained by the outer diameters of filled hollow-fiber membranes 1 to the cross-sectional area of the lumen of housing 11 perpendicular to the longitudinal direction of hollow-fiber membranes 1 filled in housing 11.

Hollow-fiber membrane 1 may contain other fluororesins and additives in addition to polytetrafluoroethylene and the modified polytetrafluoroethylene as long as the desired effects of the present disclosure are not impaired. Examples of the additives include inorganic fillers, metal powders, metal oxide powders, and metal sulfide powders for improving wear resistance, preventing low-temperature flow, and facilitating pore formation.

[Method for Producing Hollow-Fiber Membrane]

Next, an example of a method for producing the hollow-fiber membrane will be described. The method for producing the hollow-fiber membrane preferably includes, for example, a molding step of molding particles of polytetrafluoroethylene or the modified polytetrafluoroethylene into a tubular shape, a sintering step of heating the tubular molded product to a temperature equal to or higher than the melting point of polytetrafluoroethylene or the modified polytetrafluoroethylene, a cooling step of cooling the molten resin, and a stretching step of stretching a nonporous tubular molded product to make it porous. As described above, by forming the hollow-fiber membrane by stretching after molding, a porous hollow-fiber membrane can be formed while reducing the diameters of the pores of the hollow-fiber membrane.

The hollow-fiber membrane is obtained, for example, by once melting polytetrafluoroethylene or the modified polytetrafluoroethylene whose heat of fusion from 296° C. to 343° C. in the third step is 30.0 J/g to 45.0 J/g in order to eliminate gaps between particles and then gradually cooling the same. That is, the method includes a step of heating polytetrafluoroethylene or the modified polytetrafluoroethylene to its melting point or higher to melt the same, a step of cooling the melted resin, and/or a step of holding the resin at 313° C. or more and less than 321° C. for 10 minutes or more.

Polytetrafluoroethylene or the modified polytetrafluoroethylene having the heat of fusion of 30.0 J/g to 45.0 J/g can be obtained by, for example, a method in which polytetrafluoroethylene having the heat of fusion of less than 30.0 J/g is irradiated with ionizing radiations such as gamma rays, X-rays, ultraviolet rays, or electronic rays, or a method in which a decomposition reaction by heating is utilized.

(Molding Step)

In the molding step, a powder of polytetrafluoroethylene or the modified polytetrafluoroethylene produced by emulsion polymerization or the like is molded into a tubular shape to obtain a tubular molded product. The particles of polytetrafluoroethylene or the modified polytetrafluoroethylene of a source material are a powder body composed of fine particles of polytetrafluoroethylene or the modified polytetrafluoroethylene. Polytetrafluoroethylene or the modified polytetrafluoroethylene dispersion which is an emulsion in which the fine particles of polytetrafluoroethylene or the modified polytetrafluoroethylene (polytetrafluoroethylene or the modified polytetrafluoroethylene powder) are dispersed in a liquid (dispersion medium) can also be used as the powder of polytetrafluoroethylene or the modified polytetrafluoroethylene as the source material. Examples of the powder of polytetrafluoroethylene or the modified polytetrafluoroethylene include a fine powder of polytetrafluoroethylene or the modified polytetrafluoroethylene produced by emulsion polymerization and a molding powder of polytetrafluoroethylene or the modified polytetrafluoroethylene produced by suspension polymerization, which are the powders composed of fine particles of polytetrafluoroethylene or the modified polytetrafluoroethylene.

When the tubular molded product having a predetermined shape and size is obtained by molding the powder of polytetrafluoroethylene or the modified polytetrafluoroethylene into the tubular shape, known methods can be used for molding a film from a powder such as a method in which an extrusion aid is added to a source material powder and mixed, followed by paste extrusion molding into a tubular shape, or a method in which molding is performed using a polytetrafluoroethylene or the modified polytetrafluoroethylene dispersion or the like and the dispersion medium is removed by drying (casting method). Since polytetrafluoroethylene or the modified polytetrafluoroethylene usually has a high melt viscosity, it is difficult to perform melt extrusion and to prepare a solution thereof, so that the above-mentioned method is generally employed.

(Sintering Step)

In the sintering step, the tubular molded product is heated to a temperature equal to or higher than the melting point of polytetrafluoroethylene or the modified polytetrafluoroethylene to obtain the nonporous tubular molded product. A hollow-fiber membrane obtained by pressing and compacting polytetrafluoroethylene particles or the modified polytetrafluoroethylene particles produced by emulsion polymerization or the like has pores or voids caused by gaps between particles or escape of the extrusion aid, but these pores or voids are eliminated or substantially continuous voids are minimized by completely melting the powder of polytetrafluoroethylene or the modified polytetrafluoroethylene. As a result, the nonporous tubular molded product is produced. The nonporous film-shaped molded article means a film having almost no pores passing through the film, and specifically, a film having a Gurley number of 5000 seconds or more is preferable. In order to completely melt the powder of polytetrafluoroethylene or the modified polytetrafluoroethylene to produce the nonporous film-like molded article having a large Gurley number, it is preferable that the powder is heated at a temperature higher than the melting point of the source material, and in order to prevent decomposition or modification of the resin, the heating temperature is preferably 450° C. or lower.

(Cooling Step)

After the sintering step, it is preferable to perform the step of cooling polytetrafluoroethylene or the modified polytetrafluoroethylene with a gradual cooling. In the cooling step, a method of raising the temperature to the melting point of polytetrafluoroethylene or the modified polytetrafluoroethylene or higher and then gradually cooling to the crystal melting point or lower, or a method of heating at a temperature slightly lower than the melting point of polytetrafluoroethylene or the modified polytetrafluoroethylene for a certain period of time (hereinafter sometimes referred to as "constant-temperature treatment") is performed. By this cooling, crystals are generated in polytetrafluoroethylene or the modified polytetrafluoroethylene, and a degree of crystallization of polytetrafluoroethylene or the modified polytetrafluoroethylene resin can be saturated before the next stretching step, so that the reproducibility of the pore sizes can be further enhanced in the production of the porous membrane. In the crystallization process, when a cooling rate is lower or the constant-temperature treatment time is longer, the degree of crystallization tends to be higher and the heat of fusion tends to increases. On the other hand, when the cooling rate is higher or the constant-temperature treatment time is shorter, the degree of crystallization tends to be lower and the heat of fusion tends to decrease.

The heat of fusion of the hollow-fiber membrane depends on the amount of this crystal formation, which is affected by the cooling rate. Therefore, in order to obtain the heat of fusion in the above range, the cooling is performed by the gradual cooling (being slowly cooled) and/or by the cooling including holding at 310° C. or more and less than 325° C. for 10 minutes or more. The gradual cooling is preferably performed at the cooling rate of −3.0° C./min or less, and more preferably at the rate of −2.0° C./min or less.

Even when the cooling rate is out of the above range, crystallization can be promoted by holding at 310° C. or more and less than 325° C. for 10 minutes or more. That is, although a highly precise temperature control is required in the gradual cooling, the highly precise temperature control is not required in the heat treatment method by holding at a constant temperature, and heat treatment can be performed more stably and homogeneously. Further, the gradual cooling from the temperature equal to or higher than the melting point cannot be performed in a state of a roll of a long product because polytetrafluoroethylenes or the modified polytetrafluoroethylenes are fused to each other, and it is necessary to perform the sintering step and the cooling step over a long time while drawing out the product at a very low linear velocity. On the other hand, according to the above-mentioned heat treatment method by holding at a constant temperature, it is possible to form a roll of a long product after cooling to a temperature lower than the melting point and to promote crystallization in the state of the roll, so that mass production becomes possible by batch treatment in large quantities. The step of holding at 310° C. or more and less than 325° C. for 10 minutes or more may be performed during cooling after the sintering step, or may be heated and held in the temperature range described above after cooling.

As the powder body or the particle body of polytetrafluoroethylene or the modified polytetrafluoroethylene used as the source material, the powder body or the particle body of polytetrafluoroethylene whose heat of fusion is adjusted to the above-mentioned range may be used as it is, or a mixture of two or more kinds of powder bodies or particle bodies of polytetrafluoroethylene at least one of which has a heat of fusion within the above-mentioned range may be used.

(Stretching Step)

In the stretching step, the nonporous tubular molded product thus obtained is stretched to be porous. The porous hollow-fiber membrane can be obtained by stretching the above nonporous tubular molded product. In the stretching step, stretching may be performed only in the axial direction, or in the axial direction and the circumferential direction (radial expansion direction). A stretching ratio in the axial direction can be, for example, 3 times to 10 times, and a stretching ratio in the circumferential direction can be, for example, 2 times to 4 times. In the hollow-fiber membrane, the size and shape of the pores can be adjusted by adjusting stretching conditions such as a stretching temperature and the stretching ratio.

The stretching is preferably performed in a range from the general yield point (hereinafter, also referred to as a "first yield point") that first appears on the load-elongation curve to the next inflection point (hereinafter, also referred to as a "second yield point") that appears before breakage.

According to the method for producing the hollow-fiber membrane, the hollow-fiber membrane having excellent aeration performance and chemical resistance can be produced.

Other Embodiments

It should be understood that the embodiments disclosed herein are illustrative in all respects and are not restrictive. The scope of the present disclosure is not limited to the configurations of the embodiments described above, but is defined by the scope of the claims, and is intended to include all modifications within the meaning and scope equivalent to the scope of the claims.

For example, in the above-described embodiment, the aeration module is configured to perfuse the liquid into the hollow-fiber membranes and aerate to the liquid. However, the aeration module may be configured to supply the gas into the hollow-fiber membranes and aerate the liquid perfused outside the hollow-fiber membranes. The aeration module has similar aeration performance regardless of whether it is configured to supply liquid into the hollow-fiber membranes or configured to supply gas into the hollow-fiber membranes.

EXAMPLES

Hereinafter, the present invention will be described in more detail with reference to examples, but the present invention is not limited to these examples.

[Measurement of Physical Property Values]

First, methods for measuring physical property values carried out in the following examples and comparative examples will be described.

(Measurement of Heat of Fusion)

A sample having a weight of 10 mg to 20 mg is taken and the PTFE is sealed in aluminum cell as needed. Here, since it is important to keep the PTFE in a free state so that it can be shrunk and deformed as much as possible, the cell is not crushed or not completely crushed.

This sample is heated and cooled under the following conditions.

After being heated from room temperature to 245° C. at a rate of 50° C./min, the sample is heated from 245° C. to 365° C. at a rate of 10° C./min (first step).

Next, after being cooled from 365° C. to 350° C. at a rate of −10° C./min and being held at the temperature, the sample is cooled from 350° C. to 330° C. at a rate of −10° C./min, and further cooled from 330° C. to 305° C. at a rate of −1° C./min (second step).

Next, after being cooled from 305° C. to 245° C. at a rate of −50° C./min, the sample is heated from 245° C. to 365° C. at a rate of 10° C./min (third step).

Measurement was performed with a sampling time of 0.5 seconds/time, and the endothermic amount and the exothermic amount were determined using a heat-flux differential scanning calorimeter DSC-60A manufactured by SHIMADZU CORPORATION. The endothermic amount in the first step is a value obtained by integration in the range from 303° C. to 353° C., the exothermic amount in the second step is a value obtained by integration in the range from 318° C. to 309° C., and the endothermic amount in the third step is a value obtained by integration in the range from 296° C. to 343° C. The endothermic amount in the third step is referred to as the heat of fusion.

(Porosity)

The dry weight and the weight in water of the sample were measured, and a volume of the sample was obtained from the difference between them. The true specific gravity of PTFE was assumed as 2.17 g/cm$^3$, and the volume of the resin constituting the sample was calculated from the dry weight. The ratio of the void volume, which is obtained by subtracting the volume of the resin from the volume of the sample, to the volume of the sample was expressed in %, and was defined as the porosity.

(Isopropanol (IPA) Bubble Point)

After the hollow-fiber membrane was immersed and impregnated in an isopropyl alcohol container and the pores in the tube wall were filled with isopropyl alcohol, air pressure was gradually applied from the inside of one end face of the hollow-fiber membrane in the immersed state, and the pressure at which bubbles first came out from the opposite end face was defined as the bubble point. The maximum pressure measured at this time was 500 kPa.

(Average Pore Size)

An average pore size was determined by the formula of Washburn using a water intrusion porosimeter.

(0.3 MPa Water Pressure Resistance Test)

The lumen of the hollow-fiber membrane was filled with water and the water pressure into the lumen was continuously increased to 0.3 MPa at a rate of 100 kPa/min, and leakage as water droplets was observed from the outer surfaces of the hollow-fiber membrane.

<Hollow-Fiber Membrane Test No. 1 and No. 2 (Examples)>

[Preparation of Source Material Powder]

The following PTFE fine powder which is a source material powder was used as a source material. The PTFE fine powder used herein is a powder obtained by drying PTFE particles (primary particles) having particle diameters of 0.15 μm to 0.35 μm produced by emulsion polymerization of tetrafluoroethylene (emulsion-polymerized product), and granulating the dried product to several hundred μm to several thousand μm.

The source material resins used in Test No. 1 and Test No. 2 are as follows.

Test No. 1 (F208 manufactured by DAIKIN INDUSTRIES, LTD.: modified PTFE)

Test No. 2 (CD-123E manufactured by AGC Inc. irradiated with 1.0 kGy of γ-rays: homo-PTFE)

The heat of fusion of each source material in the third step is shown in Table 1.

[Molding Step]

The obtained PTFE powder was formed into a tube under the following conditions. As a method for molding into a tubular shape, for example, a paste extrusion method or a Ram extrusion method described in "Fluororesin handbook (written by Takaomi Satogawa, THE NIKKAN KOGYO SHIMBUN, LTD.)" can be used. For Test No. 1 and Test No. 2, the paste extrusion method described above was used. The powder of PTFE was mixed with 23 parts by mass of a liquid lubricant ("Solvent Naphtha", manufactured by FUJIFILM WAKO CHEMICAL CORPORATION), and the mixture was pressed and compacted into a cylindrical shape by a preforming machine, and then extruded into a coiled shape by an extruder. The cylinder and die temperatures were 50° C. In Test No. 1, the extruder with a cylinder diameter of 40 mm, a mandrel diameter of 10 mm, a die diameter of 1.0 mm, a core pin diameter of 0.5 mm and a reduction ratio (reduced cross-sectional area ratio) of 2000. In Test No. 2, the extruder with the cylinder diameter of 30 mm, the mandrel diameter of 10 mm, the die diameter of 0.8 mm, the core pin diameter of 0.4 mm, and the reduction ratio of 1667 was used.

[Drying Step]

In the drying step, the liquid lubricant was dried in a hot-air circulating thermostatic bath at 200° C.

[Sintering Step]

The tubular molded product was heated at a furnace temperature of 420° C., which is equal to or higher than the melting point of PTFE or the modified PTFE, and sintered at a draw ratio of 0.9 by a continuous sintering and stretching machine to obtain a semi-transparent nonporous tube.

[Gradual Cooling Step]

The semi-transparent nonporous tube in the form of spiral coil was placed in the hot-air circulating thermostatic bath, heated at 350° C. for 5 minutes or more, and continuously gradually cooled to 300° C. or less at a cooling rate of −1° C./min or less.

[Stretching Step]

In the stretching step, the obtained nonporous tubular molded product was stretched under the following conditions to obtain a porous tubular molded product. The obtained nonporous tubular molded product was stretched at 170° C. with a chuck-width of 10 mm and a stretching speed of 500 mm/min using a tensile tester (Autograph AG500 equipped with a thermostat manufactured by SHIMADZU CORPORATION). For obtaining the average outer diameter and the average inner diameter, diameters were measured at randomly selected two points and average values were calculated. The average thickness was calculated from a formula of (average outer diameter−average inner diameter)/2 at the two points. An axial stretching ratio of the hollow-fiber membrane of each test number is shown in Table 1, and average outer diameter D2, average inner diameter D1 and average thickness T1 are shown in Table 2.

<Hollow-Fiber Membrane Test No. 3 (Comparative Example)>

A liquid lubricant (Solvent Naphtha manufactured by FUJIFILM WAKO PURE CHEMICAL CORPORATION)

is mixed with a PTFE powder shown below as the source material powder, and the mixture is pressed and compacted, followed by paste extrusion molding into a tubular shape to prepare a tubular molded body. At that time, 19 parts by mass of the liquid lubricant was blended. The extruded product was heated to 200° C. to dry and remove the liquid lubricant, thereby obtaining an unsintered tube. Thereafter, it was stretched in the longitudinal direction at 280° C. using the continuous sintering and stretching machine to make it porous, and then sintered at 380° C. to prepare a porous tubular molded body. Table 1 shows the temperature of the die used in the extrusion molding and the axial stretching ratio in the stretching step in Test No. 3, and Table 2 shows average outer diameter D2, average inner diameter D1, and average thicknesses T1. In Test No. 3, CD123E (homo PTFE) manufactured by AGC Inc. was used as the source material resin. The heat of fusion in the third step of the source material resin of Test No. 3 is shown in Table 1.

The extrusion conditions of the hollow-fiber membranes of Test Nos. 1 to 3 are shown in Table 1. In addition, the measurement results of porosities K, isopropanol bubble points, and average pore sizes, the 0.3 MPa water pressure resistance test results, and the calculation results of K/(T1× D2×100) are shown in Table 2.

TABLE 1

| Hollow-Fiber Membrane Test No. | Source Material | Product Number (+Irradiation Amount) | Heat of Fusion in Third Step [J/g] | Lubricant (parts by mass) | Extruder Dimensions [mm] | | | | | Extruder Temperature [° C.] | | Nonporous Treatment before Sintering and Stretching Steps | Axial Stretching Ratio |
|---|---|---|---|---|---|---|---|---|---|---|---|---|---|
| | | | | | Cylinder | Mandrel | Die | Pin | R. R. | Cylinder | Die | | |
| No. 1. | Modified PTFE | F208 | 35.0 | 23 | 40 | 10 | 1.0 | 0.5 | 2000 | 50 | 50 | Present | 5.00 |
| No. 2 | PTFE | CD123E + 1.0 kGy | 45.0 | 23 | 30 | 10 | 0.8 | 0.4 | 1667 | 50 | 50 | Present | 5.00 |
| No. 3 | PTFE | CD123E | 26.0 | 19 | 50 | 20 | 2.5 | 1.2 | 437 | 50 | 50 | Absent | 1.87 |

TABLE 2

| Hollow-Fiber Membrane Test No. | Average Outer Diameter D2 [mm] | Average Inner Diameter D1 [mm] | Average Thickness T1 [mm] | Porosity K [%] | K/(T1 × D2 × 100) | IPA Bubble Point [mm] | Average Pore Size [nm] | 0.3 MPa Water Pressure Resistance Test |
|---|---|---|---|---|---|---|---|---|
| No. 1 | 0.633 | 0.275 | 0.179 | 54 | 4.8 | 500 or more | 9.4 | No Leakage |
| No. 2 | 0.310 | 0.155 | 0.078 | 43 | 17.9 | 500 or more | 5.2 | No Leakage |
| No. 3 | 1.770 | 0.840 | 0.465 | 23 | 0.3 | 181 | 68.0 | No Leakage |

<Aeration Module Test No. 11 to Test No. 14 (Hollow-Fiber Membrane Test Nos. 1 to 3)>

Aeration modules including the hollow-fiber membranes of Test Nos. 1 to 3 (aeration module Test Nos. 11 to 14) were produced. In these aeration modules, the filling rate of the hollow-fiber membranes was set to 40%, and barrels having two different inner diameters and effective lengths were mounted. Four kinds of aeration modules having different numbers of hollow-fiber membranes were manufactured. In each aeration module, a housing containing fluororesin as a main component was used. The housing volumes of the aeration modules, the numbers of hollow-fiber membranes enclosed, and the filling rates are shown in Table 3. The housing volume was determined by calculating the product of the internal cross-sectional area of the barrel and the effective length.

[Aeration Performance Evaluation of Aeration Module]

At a room temperature of 25° C., pure water having a dissolved oxygen concentration of 0.6 ppm was allowed to pass through the lumens of the hollow fibers of the aeration module, and air having a gauge pressure of 10 kPa was swept and brought into contact with the outer surface of the hollow-fiber membrane to evaluate the aeration performance of the aeration module. At this time, the pure water flow rate was gradually increased from 0.5 ml/min, and the maximum flow rate per minute at which the pure water after the aeration treatment can maintain the dissolved oxygen concentration of 8 ppm or more was defined as the 8 ppm achieving maximum flow rate per minute. The maximum flow rate per minute at which the dissolved oxygen concentration of 8 ppm or more can be maintained and the maximum flow rate per minute at which the dissolved oxygen concentration of 8 ppm or more per unit inner surface area of the aeration module can be maintained are shown in Table 3.

As described above, it was shown that the aeration module is excellent in aeration performance and chemical resistance. Therefore, the aeration module is suitably used for aeration devices in semiconductor manufacturing processes, waste water treatment processes, beverage and food manufacturing processes, chemical liquid manufacturing processes, or the like.

REFERENCE SIGNS LIST 1 hollow-fiber membrane
2 membrane member
3 aeration module
4 first sealing portion
5 second sealing portion
7 liquid supply port
8 liquid discharge port
9 gas supply port
19 gas discharge port
11 housing
12 first sleeve
13 first cap
14 second sleeve
15 second cap

The invention claimed is:

1. An aeration module capable of aerating a liquid supplied to inner portions of hollow-fiber membranes, comprising:
   a housing containing a fluororesin as a main component; and
   a plurality of the hollow-fiber membranes containing polytetrafluoroethylene or a modified polytetrafluoroethylene as a main component,

TABLE 3

| Aeration Module Test No. | Hollow-Fiber Membrane Test No. | Inner Diameter of Barrel [mm] | Effective Length [mm] | Module Internal Volume [mL] | Filling Rate [%] | Number of Hollow-Fiber Membrane | Membrane Area [cm²] | Maximum Flow Rate per Minute for Pure Water having Dissolved Oxygen Concentration of 8 ppm or more [mL/min] | Maximum Flow Rate per Minute per Unit Inner Surface Area for Pure Water having Dissolved Oxygen Concentration of 8 ppm or more [mL/(cm² · min)] |
|---|---|---|---|---|---|---|---|---|---|
| No. 11 | No. 1 | 12 | 50 | 6 | 40 | 140 | 60 | 2.5 | 0.042 |
| No. 12 | No. 1 | 45 | 100 | 160 | 40 | 2000 | 1730 | 63.0 | 0.036 |
| No. 13 | No. 2 | 12 | 50 | 6 | 40 | 600 | 150 | 11.0 | 0.073 |
| No. 14 | No. 3 | 45 | 100 | 160 | 40 | 250 | 660 | 13.0 | 0.020 |

As shown in Table 3, the aeration modules of Test Nos. 11 to 13 each containing polytetrafluoroethylene or the modified polytetrafluoroethylene as the main component and satisfying K/(T1×D2×100)≥2.0 in terms of porosity K [%], average thickness T1 [mm], and average outer diameter D2 [mm] of the hollow-fiber membrane showed high throughput. In particular, the aeration module of No. 13 including the hollow-fiber membrane of No. 2 having a high value of K/(T1×D2×100) showed very high throughput per inner surface area. On the other hand, in the aeration module of Test No. 14 including the hollow-fiber membrane that does not satisfy K/(T1×D2×100)≥2.0, the throughput per inner surface area was poor. In addition, in the aeration module of Test No. 14, the maximum flow rate of pure water with the dissolved oxygen concentration of 8 ppm or more was very low as compared with the aeration module of Test No. 12 having the same internal volume.

wherein a porosity K [%], an average thickness T1 [mm], and an average outer diameter D2 [mm] of the hollow-fiber membranes satisfy a relation of a formula (1) below:

$$K/(T1 \times D2 \times 100) \geq 2.0; \qquad (1)$$

wherein the hollow-fiber membranes have a heat of fusion of 30 J/g to 45 J/g, as measured by differential scanning calorimetry (DSC), wherein the heat of fusion is defined as an integrated endothermic heat amount from 296° C. to 343° C. obtained in a third heating step of a DSC measurement that includes a first heating step, a second heating step, and the third heating step, and wherein the hollow-fiber membranes have an average outer diameter D2 of 0.70 mm or less, an average inner diameter D1 of 0.32 mm or less, and a porosity K of 30% or more.

2. The aeration module according to claim 1, wherein the hollow-fiber membranes have a water pressure resistance of 0.3 MPa or more.

3. The aeration module according to claim 1, wherein when pure water with a dissolved oxygen concentration of 0.6 ppm or less is supplied to the inner portions of the hollow-fiber membranes and air is caused to permeate at a pressure of 10 kPa, a maximum flow rate per minute at which the pure water after aeration treatment is capable of maintaining a dissolved oxygen concentration of 8 ppm or more is 0.035 mL/(cm$^2$·min) or more relative to a unit inner surface area of the hollow-fiber membranes.

4. The aeration module according to claim 1, wherein the main component of the housing is a tetrafluoroethylene/perfluoroalkyl vinyl ether copolymer, polytetrafluoroethylene, a tetrafluoroethylene/hexafluoropropylene copolymer, or a combination thereof.

5. The aeration module according to claim 2, wherein when pure water with a dissolved oxygen concentration of 0.6 ppm or less is supplied to the inner portions of the hollow-fiber membranes and air is caused to permeate at a pressure of 10 kPa, a maximum flow rate per minute at which the pure water after aeration treatment is capable of maintaining a dissolved oxygen concentration of 8 ppm or more is 0.035 mL/(cm$^2$·min) or more relative to a unit inner surface area of the hollow-fiber membranes.

6. The aeration module according to claim 2, wherein the main component of the housing is a tetrafluoroethylene/perfluoroalkyl vinyl ether copolymer, polytetrafluoroethylene, a tetrafluoroethylene/hexafluoropropylene copolymer, or a combination thereof.

7. The aeration module according to claim 3, wherein the main component of the housing is a tetrafluoroethylene/perfluoroalkyl vinyl ether copolymer, polytetrafluoroethylene, a tetrafluoroethylene/hexafluoropropylene copolymer, or a combination thereof.

8. The aeration module according to claim 5, wherein the main component of the housing is a tetrafluoroethylene/perfluoroalkyl vinyl ether copolymer, polytetrafluoroethylene, a tetrafluoroethylene/hexafluoropropylene copolymer, or a combination thereof.

9. The aeration module according to claim 1, wherein the hollow-fiber membranes have an average pore size of 5.2 nm to 9.4 nm.

* * * * *